(12) United States Patent
Beilis et al.

(10) Patent No.: US 11,580,094 B2
(45) Date of Patent: Feb. 14, 2023

(54) REAL-TIME ANOMALY DETERMINATION USING INTEGRATED PROBABILISTIC SYSTEM

(71) Applicant: Capital One Services, LLC, McLean, VA (US)

(72) Inventors: David Beilis, McLean, VA (US); Alexey Shpurov, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 79 days.

(21) Appl. No.: 17/331,816

(22) Filed: May 27, 2021

(65) Prior Publication Data

US 2022/0382736 A1 Dec. 1, 2022

(51) Int. Cl.
*G10L 15/197* (2013.01)
*G06F 16/23* (2019.01)
*G06N 7/00* (2023.01)

(52) U.S. Cl.
CPC ...... *G06F 16/2365* (2019.01); *G06F 16/2379* (2019.01); *G06N 7/005* (2013.01); *G10L 15/197* (2013.01)

(58) Field of Classification Search
CPC .................................................. G10L 15/197
USPC ....................................................... 704/257
See application file for complete search history.

(56) References Cited

U.S. PATENT DOCUMENTS

| 10,045,218 | B1* | 8/2018 | Stapleton | H04M 7/0078 |
| 11,334,346 | B2* | 5/2022 | Fox | G06F 11/1433 |
| 2017/0353477 | A1* | 12/2017 | Faigon | G06F 21/6209 |
| 2021/0211447 | A1* | 7/2021 | Albero | G06N 3/08 |

OTHER PUBLICATIONS

S. Abbady, C.-Y. Ke, J. Lavergne, J. Chen, V. Raghavan and R. Benton, "Online mining for association rules and collective anomalies in data streams," 2017 IEEE International Conference on Big Data (Big Data), 2017, pp. 2370-2379, doi: 10.1109/BigData.2017. 8258192. (Year: 2017).*

* cited by examiner

*Primary Examiner* — Bharatkumar S Shah
(74) *Attorney, Agent, or Firm* — Perkins Coie LLP

(57) ABSTRACT

An audio stream is detected during a communication session with a user. Natural language processing on the audio stream is performed to update a set of attributes by supplementing the set of attributes based on attributes derived from the audio stream. A set of filter values is updated based on the updated set of attributes. The updated set of filter values is used to query a set of databases to obtain datasets. A probabilistic program is executed during the communication session by determining a set of probability parameters characterizing a probability of an anomaly occurring based on the datasets and the set of attributes. A determination is made if whether the probability satisfies a threshold. In response to a determination that the probability satisfies the threshold, a record is updated to identify the communication session to indicate that the threshold is satisfied.

20 Claims, 4 Drawing Sheets

REAL-TIME ANOMALY DETERMINATION USING INTEGRATED PROBABILISTIC SYSTEM

BACKGROUND

Database transaction anomalies may be indicative of malicious user behavior or hacking attempts by entities that have taken control of a user's account. Quantities associated with the database transactions, such as amounts by which a value of a record changes, may often be used as input attributes for various anomaly detection operations. Other information, such as demographic information or transaction location information, may also be used to as inputs for anomaly detection operations.

SUMMARY

Aspects of the invention relate to methods, apparatuses, media, and/or systems for increasing response speed and system efficiency for detecting anomalies. A computer system may perform operations to determine whether an attempt to modify records of a database triggers any criteria indicating an anomaly. Many anomalies may be detected when coupled with communication records, where analysis of the communication records may be performed in real-time or within a designated transaction time threshold. Such operations may increase the computational cost and complexity of an anomaly-detecting operation and reduce the effectiveness of deep learning methods that rely on a significant amount of processing power or memory. Moreover, a data system may expect to see more than one thousand, more than one million, more than one billion database transactions, or some other number of database transactions per day, which may make computationally expensive anomaly detection methods unviable in real-world scale. Additionally, traditional rule-based systems used for anomaly detection may be slow to update and poorly suited for the detection of hacking or fraud attempts.

Methods and systems described herein may provide operations that may increase anomaly detection speeds and increase the accuracy of anomaly detection for transactions across different databases using an integrated probabilistic model. Some embodiments may use attributes collected from a record to predict a database transaction or behavior and flag a database transaction or communication session associated with a database transaction as anomalous if the attributes deviate from an expected database transaction or behavior determined using a set of simulated outcomes. As an example, such methods or related systems may predict an anticipated future database transaction or request for a database transaction in a set of simulated outcomes using probabilistic methods. Some embodiments may then label a record, a database transaction of the record, or a communication session associated with the record to be anomalous based on the predictions. In some embodiments, the predictions may be generated in real-time and may be dynamic to data related to a transaction, such as a verbal data from an online text session, verbal data from a conversation, or the like.

In some embodiments, an audio stream with a user during a communication session may be detected. A set of attributes related to the user may be updated, at each interval of a sequence of intervals of the communication session. The set of attributes related to the user may be updated by performing natural language processing on the audio stream to supplement the set of user-related attributes with attributes derived from the audio stream during the interval. The set of attributes related to the user may be updated using a data filter to determine a set of filtered attributes. The updating by the data filter may include selecting attributes of the updated set of user-related attributes based on a set of filter criteria associated with the updated data filter. The updating by the data filter may include using the updated data filter to query a set of databases to obtain anomaly-related datasets related to the set of user-related attributes, wherein each dataset of the anomaly-related datasets is associated with least one filtered attribute of the updated data filter. The updating by the data filter may include executing, during the communication session, a probabilistic program. The probabilistic program may include using a machine learning model to determine a first probability of an anomaly occurring based on the set of user-related attributes. Executing the probabilistic program may include determining a second probability of the anomaly occurring by 1) determining a set of probability parameters for a projected probability of anomaly occurrence based on the datasets and 2) determining the second probability based on the probability parameters and the data filter. In response to a determination that a difference between the first and second probabilities satisfies an anomaly threshold indicating the detection of the anomaly, a record identifying the communication session with an anomaly flag may be updated during the communication session.

In some embodiments, an audio stream may be detected during a communication session with a user. Natural language processing may be performed on the audio stream to update a set of attributes by supplementing the set of attributes based on attributes derived from the audio stream. A set of filter values may be updated based on the updated set of attributes. The updated set of filter values may be used to query a set of databases to obtain datasets. A probabilistic program may be executed during the communication session, where executing the probabilistic program may include determining a set of probability parameters characterizing a probability of an anomaly occurring based on the datasets and the set of attributes. A determination may be made if whether the probability satisfies a threshold. In response to a determination that the probability satisfies the threshold, a record identifying the communication session may be updated to indicate that the threshold is satisfied.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases. well-known structures and devices are shown in block diagram form in order to avoid unnecessarily obscuring the embodiments of the invention.

Example Systems

Figure 1:
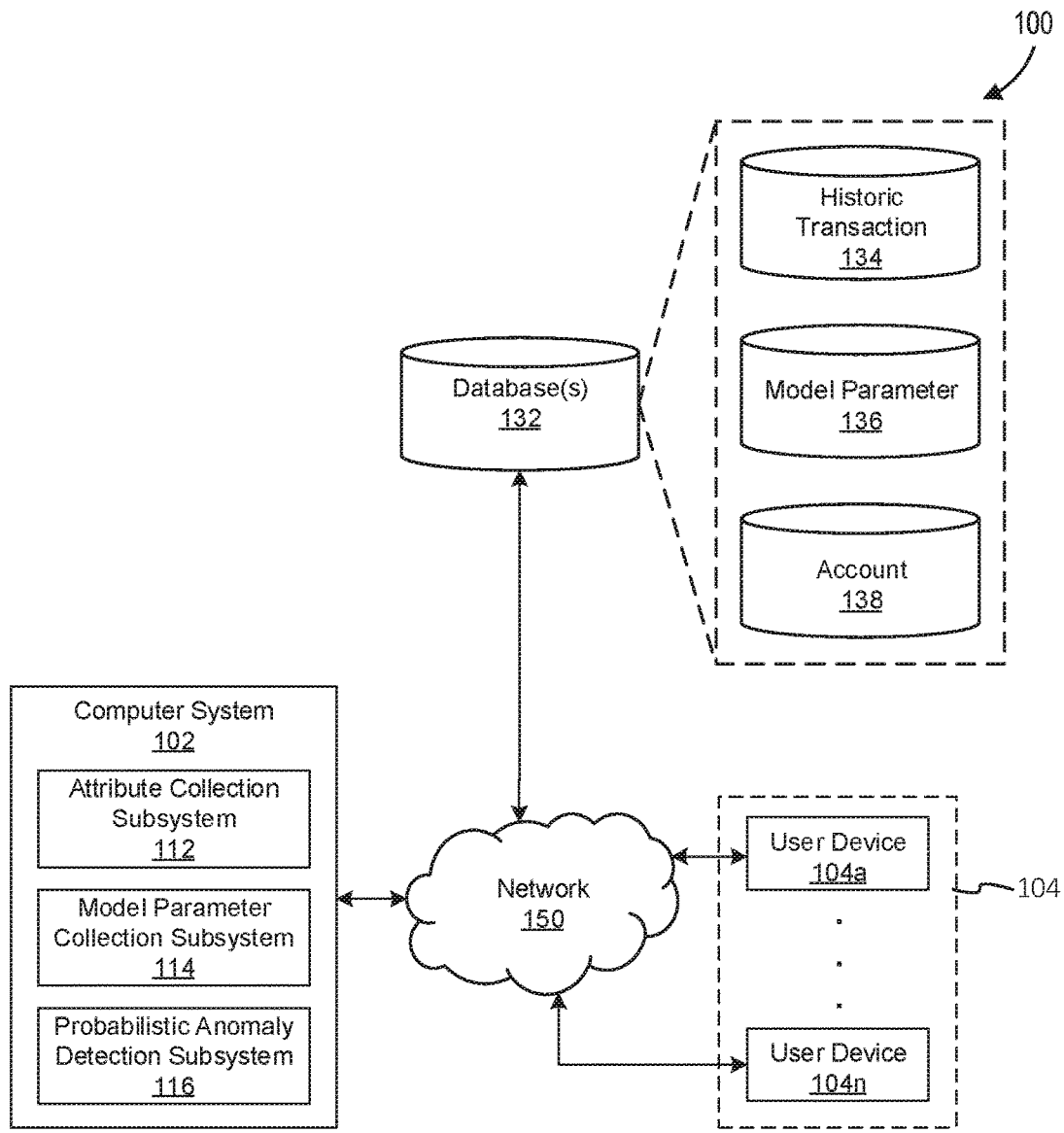
FIG. 1 shows a system for anomaly detection using an integrated probabilistic system, in accordance with one or more embodiments.

FIG. 1 shows a system for anomaly detection using an integrated probabilistic system, in accordance with one or more embodiments. As shown in FIG. 1, system 100 may include computer system 102, a set of user devices 104 including user devices 104a-104n, or other components. The computer system 102 may include an attribute collection subsystem 112, model parameter collection subsystem 114, a probabilistic anomaly detection subsystem 116, and/or other components. Each user device of the set of user devices 104 may include any type of mobile terminal, fixed terminal, or other device. By way of example, a user device of the set of user devices 104 may include a desktop computer, a notebook computer, a tablet computer, a smartphone, a wearable device, or other user device. Users may, for instance, utilize one or more device of the set of user devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of the computer system 102, those operations may, in some embodiments, be performed by components of the set of user devices 104. It should be noted that, although some embodiments are described herein with respect to neural network models, other machine learning models (e.g., random forest, support vector machines, k-nearest neighbors, or others) may be used in lieu of or in addition to neural network models in other embodiments (e.g., a random forest model replacing a neural network model).

In some embodiments, the system 100 may detect anomalies based on data associated with a database record or database transactions of one or more database records. Data associated with a record or an account may include the record itself, a data of a database transaction updating the record, data collected from a user identified by the account record, or a communication session associated with the record. As used in this disclosure, a communication session associated with the record may include a recorded identifier of the record, identifier of a user identified by the record, etc. Furthermore, data associated with a transaction may include or be stored in a record of a database transaction, where a database transaction may include set of queries to a database, and where the queries may include attribute values, attribute names, attribute categories, or the like. For example, a database transaction may include an operation to send a query to a database API and retrieve a set of attribute values of a record identified by the query.

In some embodiments, the data associated with a record may include real-time inputs provided by an attribute collection subsystem 112. For example, as described elsewhere in this disclosure, the attribute collection subsystem 112 may use a natural language processing (NLP) model to convert text data into a set of attributes and corresponding attribute values during a time interval of a communication session. As used in this disclosure, an attribute may represent a property of a record and an attribute value may represent values of that property. For example, a record may include a first attribute "no_address" and an associated first attribute value "true." As used in this disclosure, updating an attribute may include updating an attribute value of the attribute. Furthermore, updating a set of attributes may include updating one or more attribute values of the set of attributes, adding an attribute or a corresponding attribute value to the set of attributes, deleting an attribute or attribute value of the set of attributes, or the like. After being updated, an updated set of attributes may then be analyzed during the communication session using a probabilistic anomaly detection subsystem 116 to determine whether the communication session should be flagged with one or more anomaly indicators using one or more operations described in this disclosure. In addition, the probabilistic anomaly detection subsystem 116 may use parameters other prediction models, such as a rule-based model or machine-learning model, for anomaly detection.

In some embodiments, data associated with a record may satisfy a set of criteria indicating an anomaly based on values stored in the record or otherwise associated with the record. For example, the system 100 may determine that a database transaction identifying a record is anomalous based on a determination that a geolocation and indicated set of words associated with the transaction satisfies a criterion indicating an anomaly. Various types of anomalies may be detected, such as anomalies indicating duplicated records, misidentified records, account hacking, fraud, theft, financial layering, etc. As further discussed below, some embodiments may determine the likelihood of one or more anomalies occurring based on data associated with a record using a probabilistic model.

Some embodiments may send outputs determined using a probabilistic model to a client computing device of the set of user devices 104, which may include instructions to determine whether a user interacted with a user interface (UI) element on a graphical display that indicates outcomes of the probabilistic model. Alternatively, or in addition, some embodiments use the outcomes to determine probability parameters to determine notifications or program instructions and send the notifications or program instructions to a device of the set of user devices 104. In some embodiments, a client computing device may determine that UI element was selected based on a user's interaction with the UI being shown a graphical display and, in response, display an associated attribute associated with the UI element.

Subsystems 112-116

In some embodiments, the attribute collection subsystem 112 may perform operations to obtain or update attributes. As described elsewhere in this disclosure, some embodiments may obtain attributes associated with database transactions based on records of completed database transactions stored in a database, such as the account database(s) 138. For example, the attribute collection subsystem 112 may obtain user-related attributes from account records of the account database(s) 138, where an account record may represent or identify individual users ('user account'), entities, sets of other accounts, etc. For example, an account record may be a user record that include scores indicating quantitative information, such as an amount of currency in a savings account. A record may also include indicators of previous events associated with the record, such as previous queries, previous completed database transactions that updated a value of the record, previous values of the record, etc. For example, an account record may store a set of previous queries made by a user via a set of previous web requests and the geolocations of the device used to send the queries. Additionally, an account record may include identifiers, references, links, or other indicators of other account records.

In some embodiments, the account may include location information indicating a set of geolocations, such as places of previous transactions, a home address, a business address, or the like. As described elsewhere in this disclosure, some embodiments may categorize a transaction with one or more category labels based on locations of previous transactions, such as categorizing a transaction as being an out-of-city or out-of-state transaction. Alternatively, or in addition, the account may include other information related to user behavior, such as a list of previous purchase types indicating categories of goods or services purchased by a user. Other information may also include values such as statistical weights used to predict the likelihood of future changes to the record, weighting values, or an indicator that the account had previously satisfied a set of criteria indicating an anomaly, an indicator that another account associated with the account record has satisfied the set of criteria, etc. For example, an account record may store a value "0.38" in association with the data field "lost PIN" to indicate a likelihood of 0.38 that a phone call or text message from a user identified by the account record will inquire about a lost PIN.

Alternatively, or in addition, some embodiments may obtain user-related attributes based on audio or video recordings, such as by obtaining user-related attributes from an audio stream of a user. In some embodiments, the recording may be stored or distributed in real-time. For example, some embodiments may distribute an audio stream to a service using an NLP model concurrently with the recording of the audio steam. The NLP model may be used on text data from a text-based communication session, such as a communication session between a user and an automated chatbot on an online messaging platform. Alternatively, the NLP model may be used on data obtained from an audio steam. For example, some embodiments may an NLP model to convert an audio stream of a phone conversation into text or a set of embedding vectors representing the text that may then be used as attributes.

Some embodiments may store different versions of the account record in different types of databases or store different portions of an account in different databases. For example, an account for a user ("user account") may include a first record in a SQL database storing a user identifier and a second record in a graph database indicating sequences of graph nodes of the graph database representing queries made by the user. Unless indicated otherwise, references to an account record of a user ("user record") may refer to a single account record or a group of account records of the user in this disclosure.

In some embodiments, the model parameter collection subsystem 114 may search or update, at least in part, one or more values of a database(s) 132, such as a historic transaction database(s) 134, a model parameter database(s) 136, or an account database(s) 138. The model parameter collection subsystem 114 may be used to obtain anomaly-related dataset(s) that include categories, scores, or other values used for a probabilistic model. The model parameter collection subsystem 114 may use a set of attributes obtained associated with a database transaction as an input(s) to select the anomaly-related dataset(s). For example, the model parameter collection subsystem 114 may obtain an anomaly-related dataset including the probability of a "lost card" anomaly in response to the attribute collection subsystem 112 determining an embedding vector generated from the phrase "lost card" as an attribute. The anomaly-related dataset may include probability parameters that characterizes a probability distribution, such as a measure of central tendency or a measure of variability. For example, a probability parameter may include the probability "60%" or parameters of a probability function, such as a probability density function or a cumulative distribution function.

The model parameter collection subsystem 114 may dynamically select different datasets or update datasets used to categorize a database transaction, a record identified by the database transaction, or a communication session associated with the database transaction. For example, the model parameter collection subsystem 114 may obtain a first anomaly-related dataset that includes a stored probability parameter indicating fraudulent behavior. The model parameter collection subsystem 114 may obtain the dataset based on a determination that a database transaction is categorized as being caused by a financial transaction categorized with the attribute "out of state." In some embodiments, the stored probability parameter may be a pre-computed value obtained from the historic transaction database(s) 134. Alternatively, or in addition, the model parameter collection subsystem 114 may obtain a set of previous transactions associated with a record (e.g., identifying the record or updating the record), where the computer system 102 may then determine a probability parameter based on the set of previous transactions.

As described elsewhere in this disclosure, some embodiments may use the probability parameter based on the set of previous transactions to determine a new probability parameter. The new probability parameter may indicate the likelihood that the database transaction, a record identified by the database transaction, or a communication session associated with the database transaction is anomalous. In some embodiments, datasets obtained by the model parameter collection subsystem 114 may be used by prediction models to determine whether to flag a record with an anomaly, where such prediction models may include a neural network model, random forest model, support vector machine, etc.

In some embodiments, the probabilistic anomaly detection subsystem 116 may determine whether to associate a record, a database transaction associated with a record, or a communication session associated with the record with an anomaly indicator. For example, some embodiments may use the probabilistic anomaly detection subsystem 116 to use one or more anomaly-related datasets obtained by the model parameter collection subsystem 114 to determine a probability parameter indicating the likelihood that a database transaction is anomalous. Some embodiments may then determine whether the probability parameter is greater than an anomaly threshold or otherwise satisfies the anomaly threshold. In response to a determination that the probability parameter satisfies the anomaly threshold, some embodiments may flag a record updated by the database transaction with an anomaly indicator, where flagging a record may include updating a first value stored in the record or updating a second value that points to the record or is otherwise associated with the record.

Figure 2:
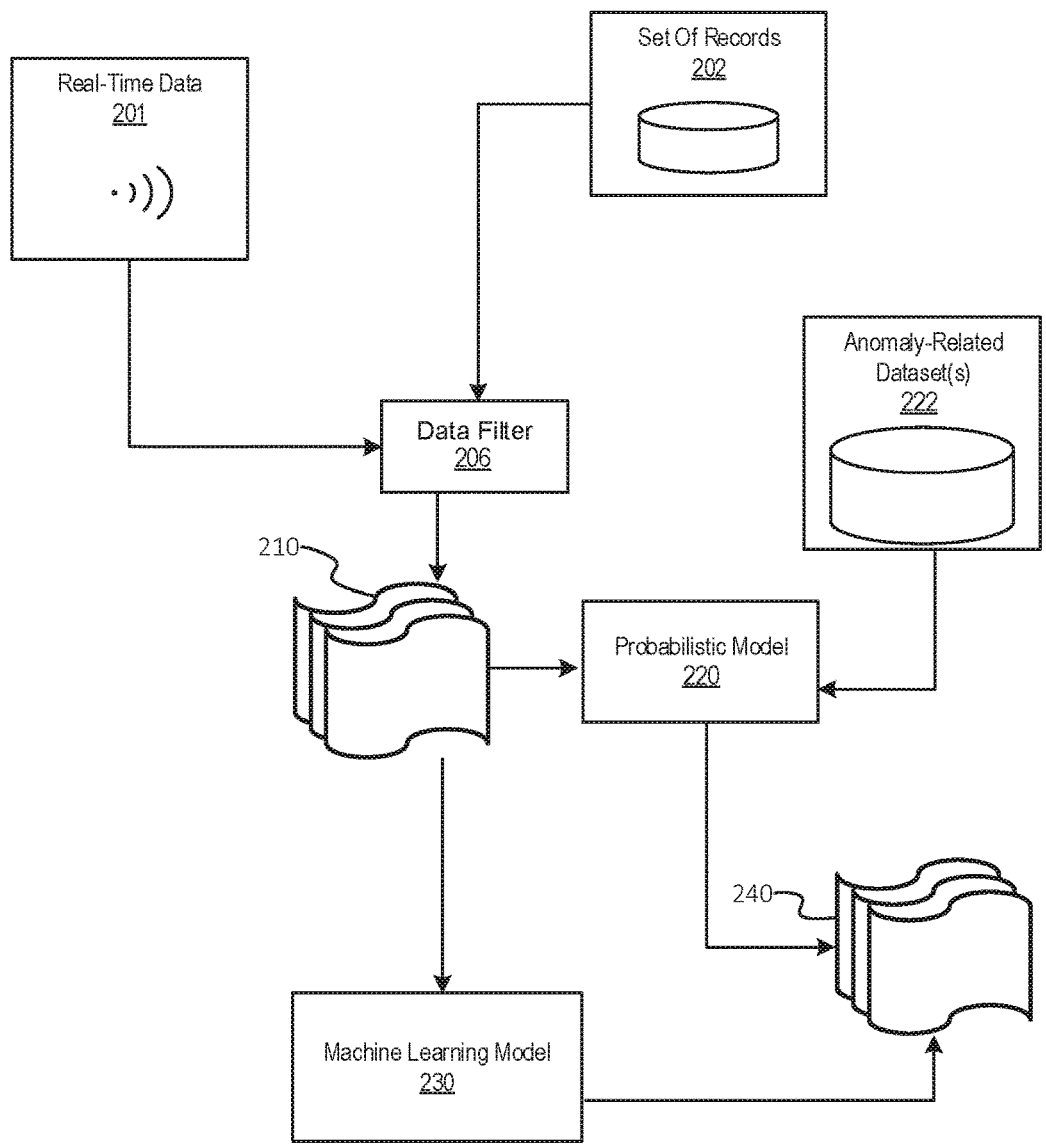
FIG. 2 shows a probabilistic program integrated with a machine learning model to detect anomalies, in accordance with one or more embodiments.

FIG. 2 shows a probabilistic program integrated with a machine learning model to detect anomalies, in accordance with one or more embodiments. A probabilistic model 220 may use a set of filtered attributes 210 to provide outputs 240, where the outputs may include simulated outcomes, probability parameters, or indicators of an anomaly. Some embodiments may retrieve attribute values from a set of records 202, where the set of stored records may include records from the account database(s) 138, records of database transaction, or other records. Some embodiments may also collect real-time data 201 associated with a record, where real-time data 201 may include data obtained during a communication session with a user associated with the record. For example, the real-time data 201 associated with a record may include an audio stream of a conversation between a first user identified by the audio stream and a database administrator, where the first user may be identified by the record. Alternatively, or in addition, the real-time data 201 may include other data such as video data, chat data from a text messaging session, etc.

Some embodiments may apply a data filter 206 to update one or more filtered attributes based on values of the real-time data 201 or the set of records 202. I Some embodiments, the data filter 206 may determine a set of filtered attributes 210 by selecting attributes of a set of attributes obtained from the real-time data 201 or the set of records 202. The probabilistic model 220 may obtain one or more anomaly-related datasets 222 to determine outputs 240 based on the set of filtered attributes 210 and the anomaly-related dataset(s) 222.

Some embodiments may use other prediction models, such as a machine learning model 230. In some embodiments, outputs 240 may be fed back to machine learning model 230 as inputs to train the machine learning model 230 (e.g., alone or in conjunction with user indications of the accuracy of the outputs 240, labels associated with the inputs, or with other reference feedback information). For example, machine learning model 230 may update its model parameters (e.g., weights, biases, or other parameters) based on its assessment of its prediction (e.g., outputs 240) and reference feedback information (e.g., user indication of accuracy, reference labels, or other information). For example, some embodiments may predict a set of query parameters that will be subsequently selected by a user and then update a set of model parameters of the machine learning model 230 based on a determination that a first probability parameter determined using the machine learning model did not match a training value. Alternatively, or in addition, some embodiments may re-train the machine learning model 230 to update the set of model parameters based on a determination that the first probability parameter is not within a matching threshold of a second probability parameter that is determined using a probabilistic model.

In some use cases, the machine learning model 230 is a neural network or includes a neural network. A neural network may be based on a large collection of neural units (or artificial neurons). A neural unit may receive a set of inputs and produce a set of outputs, where each neural unit of a neural network may be connected with many other neural units of the neural network. The output of a first neuron may be provided as an input to a second neuron. Such connections can be enforcing or inhibitory in their effect on the activation state of connected neural units. In some embodiments, each individual neural unit may use a summation function or other aggregation function which combines the values of its inputs together. In some embodiments, each connection (or the neural unit itself) may have a threshold function such that the value(s) of an input(s) must surpass the threshold before the value(s) or result of the value(s) are propagated as outputs to other neural units. These neural network systems may be self-learning and trained, rather than explicitly programmed, and can perform significantly better in certain areas of problem solving, as compared to traditional computer programs.

The functions or internal parameters of a neural unit in a neural network or an architecture of the neural network may provide additional features. Some embodiments may use a feed-forward neural network, which may provide features such as faster results. Some embodiments may use a neural network having multiple layers (e.g., where a signal path traverses from front layers to back layers) to increase accuracy. In some embodiments, back-propagation techniques may be utilized by the neural networks, where forward stimulation is used to reset weights on the "front" neural units. In some embodiments, stimulation and inhibition for neural networks may be more free flowing, with connections interacting in a more chaotic and complex fashion. As further described below, some embodiments may use concurrently use different types of machine learning models to perform different tasks. For example, some embodiments may use a shallow (e.g., fewer than 4 layers) feed forward neural network to classify an account record to determine a search parameter for the account record and use a deep recurrent neural network to detect anomalies based on account record values determined based in part on the search parameter.

Connection weights of the neural network, biases of the neural network, or other model parameters may be adjusted to reconcile differences between the neural network's prediction and the reference feedback. For example, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 230 may be trained to generate better predictions.

In some embodiments, the machine learning model 230 may be trained using multiple datasets, such as a training dataset and a test dataset. For example, in some embodiments, a training dataset or a test dataset may include a set of records that include a set of previous attributes for each record of a set of records and a corresponding set of categorizations indicating whether the respective record is labeled with one or more anomalies. Some embodiments may use the training dataset to train a machine learning model to determine one or more category values based on attributes of a record in the training dataset, a database transaction associated with the record, or a communication session associated with the record.

As described elsewhere in this disclosure, some embodiments may store a plurality of machine learning models or a plurality of sets of model parameters of the machine learning models. Some embodiments may select a machine learning model from a set of models based on a filtered attribute value. For example, some embodiments may select a LSTM neural network model based on a determination that a first filtered attribute value includes an embedding vector representation of the phrase "lost my card." In some embodiments, the set of models may include other types of models, such as a regression model comprising parameters of a regression curve. For example, a set of models may include a neural network model and a regression model by including a set of model parameters for the neural network model and the regression model, respectively.

Example Flowchart

Figure 3:
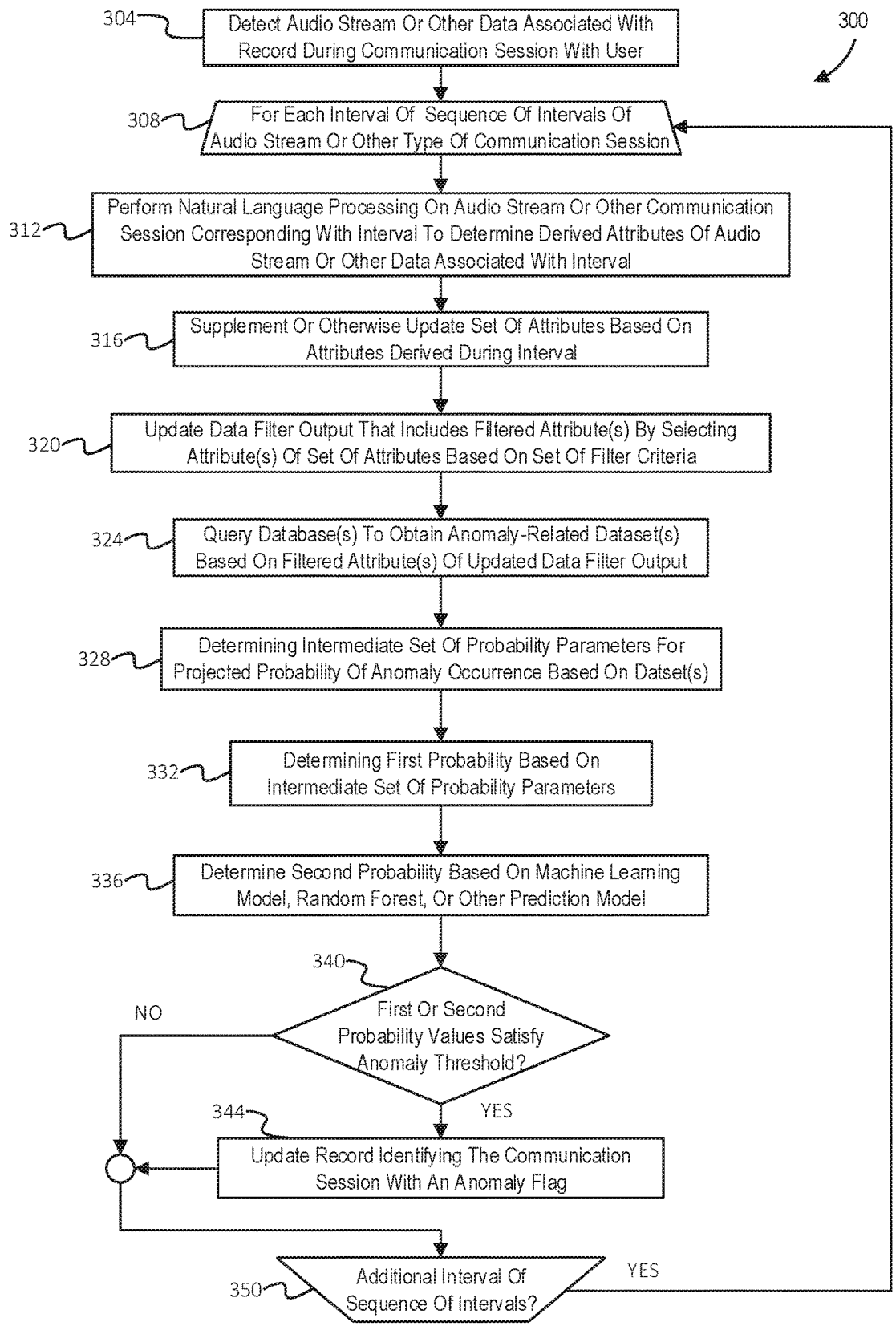
FIG. 3 shows a flowchart of operations to detect anomalies using a probabilistic system during a record-related conversation, in accordance with one or more embodiments.

FIG. 3 shows a flowchart of operations to detect anomalies using a probabilistic system during a record-related conversation, in accordance with one or more embodiments. The processing operations of each method presented below are intended to be illustrative and non-limiting. In some embodiments, for example, the methods may be accomplished with one or more additional operations not described or without one or more of the operations discussed. For example, some embodiments may perform operations described for block 340 without performing operations to determine a second probability value as described for block 336. Additionally, the order in which the processing operations of the methods are illustrated (and described below) is not intended to be limiting.

In some embodiments, operations of the process 300 may include detecting an audio stream or other data associated with a record during a communication session with a user identified by the record, as indicated by block 304. Some embodiments may detect data associated with a record via an identifier of the record that is inputted into a UI during a communication session. For example, some embodiments may associate an audio stream with a user record after an administrator enters an account number identifying the user record into a computer system during the audio stream. Once the audio stream is associated with the record, a computer system is able to access the audio stream in real-time and use values stored in the account record or other values associated with the account record to detect one or more anomalies, as described elsewhere in this disclosure.

Some embodiments may detect data associated with a record based on one or more attributes collected from an audio stream, video stream, etc. For example, as described elsewhere in this disclosure, some embodiments may obtain an audio stream of a user and use one or more NLP models to detect words, numbers, phrases, or other n-grams of the audio stream to obtain an identifier. Some embodiments may then parse the collected n-grams to determine an identifier(s) of a record and retrieve the corresponding record(s) of the identifier(s). For example, some embodiments may obtain an audio stream of a user speaking through a client computing device and detect the phrase "I would like to access account y575311." As described elsewhere in this disclosure, some embodiments may update a set of attributes by generating a new attribute "y575311" using an NLP model. Alternatively, or in addition, some embodiments may update an existing attribute to include "y575311" as an attribute value, and retrieve a user record associated with the account identifier "y575311" for use in one or more anomaly-detection operations.

In some embodiments, operations of the process 300 may include performing a set of anomaly-detection operations for each interval of a sequence of intervals of an audio stream or other type of communication session associated with a record, as indicated by block 312. For example, a set of operations describing blocks 312-344 may be performed for each time interval of a sequence of intervals during an audio or video stream while the audio or video stream is being distributed. Alternatively, or in addition, some embodiments may perform one or more operations described by blocks 312-344 without segmenting the duration of the audio stream or other time-based data. For example, as described elsewhere in this disclosure, some embodiments may perform natural language processing on the entirety of an audio stream to obtain a set of attributes or update an existing set of attributes without segmenting the audio stream by corresponding time intervals. Alternatively, or in addition, some embodiments may then obtain a set of filter values based on the attributes, use the set of filter values to query a database (s) to obtain an anomaly-related dataset(s), and use the anomaly-related dataset(s) to compute a set of probability parameters for the data associated with the record during or after an audio stream.

Alternatively, or in addition, some embodiments may perform one or more operations described for block 312-344 without obtaining an audio stream or other media. For example, as described elsewhere in this disclosure, some embodiments may obtain an anomaly-related dataset based on a user record, where the user record itself may be obtained based on a manual entry into a UI, an analysis program that selects different account records to perform anomaly-detection operations, etc. Furthermore, some embodiments may retroactively perform one or more operations described in this disclosure to detect anomalies based on database transactions, past audio or visual recordings, or other data associated with a record. For example, some embodiments may perform one or more of the operations described in this disclosure to determine whether or not to label a record or a database transaction that modified the record as an anomaly hours after the database transaction is modified.

In some embodiments, the process 300 includes performing natural language processing on an audio stream or other communication session corresponding with the interval to determine a set of derived attributes of the audio stream or other data associated with the interval, as indicated by block 312. When converting audio data into text-based data, some embodiments may use one or more speech-to-text models, services, or applications. Some embodiments may perform speech-to-text functionality directly. For example, some embodiments may convert digital sound measurements into a set of phonemes and match subsets of the set of phonemes into words, phrases, numbers, or other n-grams using a database of n-grams. Some embodiments may select different databases or different combinations of databases based on a record associated with the audio stream or a category associated with the record. Alternatively, or in addition, some embodiments may use a cloud service to obtain text data from a recorded audio stream. For example, some embodiments may direct an audio stream to an API of a speech-to-text service and obtain output transcription of the audio stream from the speech-to-text service.

After obtaining text data from an audio stream, some embodiments may perform preprocessing on the text data where preprocessing may include rooting, stemming, or lemmatizing the text data. Some embodiments may then generate a set of scores by tokenizing the words, phrases, sentences, paragraphs, or other n-gram or collection of n-grams of the text. For example, some embodiments obtain word scores represented as embedding vectors in a feature space, where the embedding vectors may be used in a statistical or probabilistic model.

As described elsewhere in this disclosure, some embodiments may determine embedding vectors based on the using a neural network model. An embedding vector may be a vector in a vector space determined using an embedding operation. For example, some embodiments may use a neural network embedding model such as the word2vec model to determine an embedding vector. Embedding vectors may be generated using other context-independent embedding models such as the Global Vectors for Word Representation model ("GloVe"). Alternatively, or in addition, word scores may also be generated using context-dependent embedding models such as Context2Vec, ELMo, or a transformer model such as a bidirectional encoder representation form transformers (BERT) model.

Using a transformer model may include determining a set of embedding vectors for words, phrases, sentences, etc. In addition, some embodiments may determine a set of positional encoding vectors, where each respective positional encoding vector is based on a position of a respective word or other n-gram of text data. Using the transformer model may include using an encoder neural network and a decoder neural network. The encoder neural network of the transformer model may include a multi-head attention model for performing self-attention operations to assign attention values to each of the words in the text data. By performing self-attention operations, some embodiments may determine the attention values assigned to each word, number, or other n-gram of text data based on relations between n-grams in the text data.

Some embodiments may determine indicators of a user intent based on database transactions associated with a user, where the user intent may be represented by one or more category values selected from a set of intent categories. An intent category may indicate or otherwise be associated with different transaction types of database transactions. For example, a first intent category may include the value "inspection" based on a database transaction corresponding with the retrieval of a numeric value stored in a user record without further modification to the user record. An intent category may indicate or otherwise be associated with different transaction types representing a combination of database transactions, where some embodiments may associate an intent category with a specific sequence of the combination of database transactions or any sequence of the combination of database transactions. For example, a first intent category "road trip purchases" may be associated with the sequence of database transactions indicated to have been initiated by one or more client computing devices positioned across a set of geolocations forming a geographic path along a set of roads.

Some embodiments may determine one or more intent category values based on attributes obtained from an audio stream or other data associated with a communication session. For example, some embodiments may determine that a database transaction is associated with a user intent category "gift deposit" based on the detection of the word "gift" using an NLP model and a determination that the database transaction increased the value of a field of an account record. As described elsewhere in this disclosure, some embodiments may determine a set of embedding vectors based on text data. For example, some embodiments may determine that an audio stream corresponding with a first time interval includes the n-gram "blockchain" and, using one or more operations described in this disclosure, map the n-gram to the embedding vector "<2152,1251,8765,532>." Some embodiments may then determine an intent category associated with a transaction type based on the embedding vector or a distance that the embedding vector is from a second vector associated with an intent category, where the intent category or an indicator of the intent category may be used as an attribute of a set of user-related attributes. As described elsewhere in this disclosure, some embodiments may then update a data filter output to include an intent category.

In some embodiments, the process 300 includes supplementing or otherwise updating a set of attributes based on attributes derived during the interval, as indicated by block 316. Some embodiments may determine a set of attributes or update a set of attributes based on attributes obtained from the text data. In some embodiments, an attribute may be directly related to the text data. For example, an attribute may indicate the presence of a specific word, embedding vector, a count of a word or embedding vector, a combination of words or embedding vectors, a pattern of words or vectors, an intent category, etc. Alternatively, or in addition, an attribute may indicate other measured values, such as a categorized speech pattern of a voice detected during an audio stream, a classification of a voice as male or female, a speed at which the voice is speaking, a voice fingerprint pattern, etc. As used in this disclosure, an attribute may be described as indicating a value if an attribute value of the attribute indicates the value. For example, the attribute "stated words" may indicate the word "transaction" if an attribute value of the attribute includes the list "['transaction'; 'database'; 'small']."

In some embodiments, the set of attributes of a user record or otherwise associated with the user record may indicate that a set of embedding vectors generated by the NLP model matches with a vector of a set of prioritization embedding vectors. As used in this disclosure, a first vector may match with a second vector based on a determination that both vectors are equal to each other. Alternatively, a first vector may match with a second vector based on a determination that both vectors are within a matching threshold of each other within their shared feature space. The set of prioritization embedding vectors may represent vectors for a special vocabulary that, if stated during an audio stream, may indicate an anomaly that causes the generation of a notification message during the audio stream. Alternatively, or in addition, some embodiments may send instructions to a server to prevent changes to a set of accounts associated with the user record. For example, a set of prioritization embedding vectors may include an account number and a name. Some embodiments may then determine that an attribute of an obtained set of embedding vectors corresponding with an audio stream matches with a first vector of the set of prioritization embedding vectors. In response, some embodiments may send a notification message to a server indicating that the match has been detected and may also instruct the server to prevent changes to a set of accounts associated with the set of prioritization embedding vectors.

In some embodiments, one or more attributes of the set of attributes may be obtained based on a comparison value between attributes obtained during different time intervals. For example, some embodiments may obtain a first attribute value for an attribute derived from the audio stream during a first interval and a second attribute value for an attribute derived from the audio stream during a second interval. The attribute may represent one of various types of information, such as a running count of the number of times that a specific n-gram or set of n-grams are used, the average number of words during each interval, and average sound volume of the audio stream, etc. For example, some embodiments may determine an average volume of a first interval as equal to 50 decibels (dB) and may determine that an average volume of a second interval is equal to 80 dB. In response, some embodiments may determine a difference of +30 dB and include the value "30" in the set of attributes corresponding with the second interval. As described elsewhere in this disclosure, the difference value may then be used to update a set of filtered attributes, such as by including the difference value as an attribute value of the set of filtered attributes. Some embodiments may then use the updated set of filtered attributes to query a set of databases to retrieve an anomaly-related dataset(s) used to determine a set of probability parameters.

While the above indicates that an attribute of a record may be obtained from real-time data associated with the record, some embodiments may obtain attributes from other data sources, such data stored in the record or data stored in other records associated with the record. Some embodiments may collect attributes from values stored in a record, database transaction records, etc. for example, some embodiments may collect a geolocation as an attribute, where the geolocation is stored in a record of a user. Some embodiments may collect attributes from a plurality of different records associated with a first record, where the plurality of different records may be identified by the first record. For example, some embodiments may collect a geolocation of a user from a first record storing demographic information for the user, collect transaction values and dates of the transactions from a second record storing transaction information, and collect methods of initiating a transaction from a third record storing database access information associated with the user. As described elsewhere in this disclosure, some embodiments may determine attributes based on other attributes. For example, some embodiments may obtain a first attribute indicating a first location that indicates the location of a computing device used to send database transaction instructions for a record, where the record is associated with a user indicated to reside at a second city. Some embodiments may then generate an attribute labeled "out of town" to indicate that the database transaction was caused by a device outside of a geographic range of the second city.

In some embodiments, the process 300 includes updating a data filter output that includes a set of filtered attributes by selecting attributes of the set of attributes based on one or more filter criteria, as indicated by block 320. As used in this disclosure, a data filter output may include a set of values that represents a set of filtered attributes. A filtered attribute of the set of filtered attributes may be equal to an attribute or a result(s). Alternatively, or in addition, a filtered attribute of the set of filtered attributes may be a result of a function based on an attribute(s). For example, a filtered attribute may be normalized and based on an input attribute, where the input attribute may be normalized by a normalization factor to determine a filtered attribute. The data filter output may be generated using a set of filter criteria, where the set of filter criteria may be used to select attributes or types of attributes for dataset determination or anomaly detection. In some embodiments, different sets of filter criteria may be stored in a set of filter criteria records. The number of attributes that may be associated with an anomaly may vary and may change quickly over time. Furthermore, the likelihood of specific attributes becoming important may change as a communication session evolves over time. By having access to multiple sets of filter criteria, some embodiments may adapt to different possible conversations during a communication session.

Some embodiments may obtain a set of filter criteria in the form of a default set of filter criteria. For example, after obtaining a set of attributes that includes attributes obtained from a time interval of an audio stream and attributes obtained from a user record, some embodiments may select attributes of the set of attributes based on which attributes satisfy a default set of filter criteria. Alternatively, or in addition, some embodiments may obtain or otherwise update a set of filter criteria based on a record or attribute. For example, some embodiments may update the criteria of a set of filter criteria after determining that an attribute of the set of attributes includes the word "red," where the updated set of filter criteria may include a first criterion that is satisfied if the set of attributes includes the word "fish" or a second criterion that is satisfied if a record includes a record having an attribute value greater than a numeric threshold.

In some embodiments, a filtered attribute may be a result of a function that takes other attributes as inputs. For example, some embodiments may retrieve a user record based on an identifier of the user record and obtain a previous set of user-related attributes stored in the user record. As described elsewhere in this disclosure, some embodiments may obtain attributes of an audio stream or other data of a communication session associated with a user. In some embodiments, these attributes may be identified as a current set of user-related attributes, where the previous set of user-related attributes may be of a same data type as the current set of user-related attributes. Some embodiments may then determine an output value of a function, where the function may use the current set of user-related attributes and the previous set of user-related attributes as inputs. For example, some embodiments may subtract an attribute of the current set of user-related attributes from an attribute of the previous set of user-related attributes to determine a difference between the attributes. Some embodiments may then use the difference as a comparison value, where the comparison value may itself be treated as an attribute. For example, as described elsewhere in this disclosure, some embodiments may select a dataset or determine a probability of an anomaly occurring based on a data filter output that includes the comparison value.

Some embodiments may determine whether a set of filter criteria records corresponding with the set of filter values was updated. In response to a determination that the set of filter criteria records was updated, some embodiments may obtain the updated set of filter criteria records, where the updated set of filter criteria records includes a first embedding vector. For example, during a communication session with a user, some embodiments may detect that the set of filter criteria used to determine one or more filtered attributes was updated after receiving update instructions from a server. Some embodiments may then use the updated set of filter criteria during the same communication session. For example, some embodiments may determine whether the set of attributes includes a first embedding vector and, in response to a determination that the set of attributes includes the first embedding vector, update the set of filter values to indicate the detection of the first embedding vector. By responding to changes in the set of filter criteria during a communication session, some embodiments may be able to incorporate changes to anomaly criteria in real-time. Furthermore, as described elsewhere, some embodiments may be capable of observing changes in computing performance caused by the update in real-time.

As described elsewhere in this disclosure, some embodiments may associate an intent category with a database transaction or a plurality of database transactions. Some embodiments may determine whether a first transaction type of a database transaction associated with the intent category matches with a second transaction type of a recorded set of database transactions. In response to a determination that the first transaction type matches with the second transaction type, some embodiments may determine that the intent category had been previously detected. In response to a determination that a transaction type associated with the intent category does not match with any transaction types of the recorded set of database transactions, some embodiments may update the data filter output to include the intent category, where the intent category may then prompt the determination of an anomaly-related dataset as described elsewhere in this disclosure.

In some embodiments, the process 300 may include querying a database to obtain a set of anomaly-related datasets based on the set of filtered attributes of the updated data filter output, as indicated by block 324. In some embodiments, one or more databases may include values corresponding to probability parameters characterizing a probability or probability distribution of anomaly occurrence for one or more anomalies. Alternatively, or in addition, some embodiments may query a database to obtain a set of previous database transactions or their associated account records. As described elsewhere in this disclosure, some embodiments may then compute an intermediate set of probability parameters based on the obtained data.

As described elsewhere in this disclosure, some embodiments may determine one or more probability parameters or other values associated with an anomaly based on anomaly-related datasets obtained from a database. Some embodiments may perform operations to determine whether a time difference between sending a request for the dataset(s) from the database and obtaining the dataset satisfies a delay duration threshold. In response to a determination that the time difference is greater than the delay duration threshold, some embodiments may reduce the number of queries made to the set of databases to obtain anomaly-related datasets. For example, some embodiments may reduce the number of attributes in a set of filtered attributes or reduce a number of values in an anomaly-related dataset. Furthermore, as described elsewhere in this disclosure, some embodiments may reduce or eliminate one or more anomaly detection operations. For example, some embodiments may reduce the number of inputs provided to a neural network or select a second neural network instead of a first neural network for anomaly prediction, where the second neural network may use less computational resources than the first neural network.

In some embodiments, the delay duration threshold may be a default parameter. Alternatively, some embodiments may responsively change the delay duration threshold based on one or more attributes or a network connection metric (e.g., bandwidth between a computing device and a server executing one or more operations described in this disclosure). For example, some embodiments may set a delay duration threshold to two seconds based on a determination that the set of attributes do not indicate that a database transaction should be associated with any anomalies. In response to a determination that a probability parameter determined using the set of attributes satisfies an anomaly threshold, some embodiments may modify the delay duration threshold to be equal to one second. Some embodiments may determine whether a time difference between when an updated set of user-related attributes is provided and when at least one of the set of probabilities is determined satisfies the delay duration threshold, such as by being less than the delay duration threshold or less than or equal to the delay duration threshold.

In some embodiments, the process 300 may include determining an intermediate set of probability parameters for a projected probability of anomaly occurrence based on the obtained anomaly-related dataset(s), as indicated by block 328. Some embodiments may determine the intermediate set of probably parameters by directly using one or more values of the obtained anomaly-related dataset(s) and the set of attributes. For example, an obtained dataset may include pre-computed probabilities that a database transaction associated with the attribute "bitcoin transaction" is anomalous. In some embodiments, these pre-computed probabilities may be used as an intermediate set of probability parameters used to determine a first probability parameter, as described elsewhere in this disclosure.

Some embodiments may compute an intermediate set of probability parameters based on a set of records or a set of previous database transactions of the set of records. For example, some embodiments may have determined that a data filter output includes the filtered attribute "magnetic swipe" indicating that a previous database transaction was caused by a swipe of a physical card associated with a user. In response, some embodiments may obtain a set of previous transactions corresponding with a population of users and perform one or more statistical operations to determine an observed probability that a database transaction associated with "magnetic swipe" will be flagged as an anomaly.

In some embodiments, the set of probability parameters may include parameters that change a probability distribution used to simulate one or more occurrences. For example, some embodiments may obtain a set of probability parameters that include a standard deviation and a mean value from a dataset. Some embodiments may then use the standard deviation and the mean value to simulate one or more occurrences to predict a probability parameter corresponding with an anomaly, as described elsewhere in this disclosure.

In some embodiments, the process 300 may include determining a first probability based on the set of probability parameters, as indicated by block 332. Some embodiments may use a probabilistic model to determine whether a database transaction or record modified by the database transaction should be indicated as anomalous based on an intermediate set of probability parameters. For example, some embodiments may obtain a dataset using one or more of the operations described above to obtain probability parameters corresponding with an anomaly categorized with the label "fraud." A first value of the dataset may indicate that a fraud rate is equal to 2% based on a set of previous database transactions representing financial transactions, a second value of the dataset may indicate that 50% of detected fraudulent transactions occur via a magnetic swipe, and a third value of the dataset may indicate that a total of 10% of financial transactions occur via a magnetic swipe. Some embodiments may use these intermediate probability parameters to simulate a set of outcomes, where each simulated set of outcomes indicates whether a simulated database transaction associated with the attribute "magnetic swipe" is anomalous. For example, using the WebPPL probabilistic programming language, some embodiments may use a probabilistic model by generating a first set of values by sampling a Bernoulli distribution corresponding with a 2%, 10%, and 50%, respectively, and combining sets of sampled values based on their indicated relationships. Some embodiments may represent these this relationship with a set of values equal to the WebPPL instructions "flip(0.1)||(flip(0.02)&&flip(0.50)." The WebPPL instructions may be modified to indicate different relationships between probability parameters and attributes. For example, some embodiments may dynamically update the Boolean "or" statements represented by the symbol "||" or the Boolean "AND" statements represented by the symbol "&&" based on attribute combinations. Some embodiments may use the set of outcomes to determine a probability value or other probability parameter of an anomaly. For example, using the values 2% and 50% above, some embodiments may determine that a transaction has a 10% probability of being fraudulent if the transaction is caused by a magnetic swipe.

Some embodiments may combine multiple outcomes determined using different attributes to determine a first probability corresponding with a set of attributes that includes the different attributes. For example, some embodiments may determine the probability of a transaction being anomalous based on the transaction being associated with a first attribute, "magnetic swipe," and a second attribute, "out of town." For example, some embodiments may first generate a first set of values based on an obtained probability parameter indicating that 10% of a population will use a magnetic swipe to start a financial transaction and a second obtained probability parameter indicating that 50% of fraud is caused by a magnetic swipe. Some embodiments may determine a second set of probability parameters based on a third value indicating that 20% of transactions occur outside of a user's resident town and a fourth value indicating that 80% of fraudulent transactions are caused by transactions started outside of the user's resident town. Some embodiments may then generate a set of outcomes that may be conditioned to determine that a probability of a database transaction being associated with an anomaly such as fraud is equal to 30%. Some embodiments may then use the computed value 30% as a first probability.

By simulating combinations of multiple attributes using a probabilistic model, some embodiments may dynamically determine the likelihood for various permutations of attributes. For example, some embodiments may use probabilistic programming operations to simulate possible outcomes of a record associated with over three attributes, over five attributes, or over 50 attributes. By using a probabilistic model, some embodiments may avoid computationally costly re-training operations used by machine learning operations, where re-training may be necessary to accurately account for different combinations of attributes. Furthermore, the use of probabilistic programming operations permits predictions to account for attribute uncertainty and attribute correlation. For example, some embodiments may use an attribute having an associated uncertainty score to determine the associated uncertainty of an event. For example, some embodiments may simulate a set of possible outcomes using probabilistic programming operations that account for uncertainty by determining a measure of variability for probability parameters. The measure of variability may then be used as an input to determine whether an anomaly threshold is satisfied.

Some embodiments may cause a UI to show a visualization that includes a shape or line indicating a probability parameter for anomaly occurrence or an associated probability parameter. For example, some embodiments may compute and display a set of probabilities for anomaly occurrence based on a set of simulated outcomes, where each respective outcome may be associated with a respective probability parameter. Furthermore, some embodiments may determine whether an attribute has been added to a set of attributes used to determine the probability parameter during a real-time communication session and whether the added attribute has modified the probability parameter. Some embodiments may then display a quantitative change to the probability parameter caused by a new filtered attribute. For example, a set of filtered attributes used as inputs to a probabilistic model may be updated from being a set of filtered attributes that consists of five attributes during a first time interval to being a set of filtered attributes that consists of six attributes during a second time interval. Some embodiments may then determine a change in a probability (e.g., a measure of central tendency), such as by determining a difference in probabilities.

Some embodiments may display the change in the probability in a UI in association with an added attribute. For example, some embodiments may use a probabilistic model to determine that a probability during a first time interval of an audio stream is equal 60% based on ten attributes collected during the first time interval. Some embodiments using the probabilistic model may then determine that the probability parameter is equal to 80% during a second time interval based on eleven attributes collected during the second time interval, where the eleven attributes include the ten attributes and an added attribute. Some embodiments may then determine a probability difference between the 60% and 80% and update a UI to display this probability difference by updating a UI element corresponding with the probability difference to display a visual representation of the probability difference. Furthermore, some embodiments may update the UI to permit a user to interact with the UI element corresponding with the probability difference to display an identifier of the added attribute. Furthermore, in cases where multiple attributes may be added to a set of attributes used to determine a probability parameter between a first and second time intervals of a communication session, some embodiments may display an attribute subset of the set of attributes that includes the added attributes. A user may interact with a UI element that displays a probability difference between the pair of time intervals to cause the display of the attribute subset on the UI.

In some embodiments, the process 300 may include determining a second probability parameter based on a neural network model, another machine learning model such as a random forest model, or another prediction model, as indicated by block 336. As described elsewhere in this disclosure, some embodiments may use other prediction models to determine one or more probability parameters. For example, some embodiments may use a trained recurrent neural network to determine a probability parameter indicating whether a behavior is anomalous or not anomalous based on a set of attributes determined using one or more operations described elsewhere in this disclosure. In some embodiments, the set of attributes used to determine the first probability using a probabilistic model may be the same as the set of attributes used as inputs for a machine learning model used to determine a second probability. For example, some embodiments may use a set of filtered attributes determined with a data filter to determine both a first probability using a probabilistic model and a second probability using a machine learning model. Alternatively, some embodiments may use different sets of inputs for the different models. Various types of neural networks may be used, such as a feedforward neural network, a recurrent neural network, a transformer neural network, etc. Alternatively, or in addition, some embodiments may use other machine learning models, such as a random forest model, naïve Bayes model, etc.

In some embodiments, the process 300 may include determining whether the first or second probabilities satisfy an anomaly threshold, as indicated by block 340. In some embodiments, the anomaly threshold may represent a minimum probability that, if exceeded, indicates that a database transaction or data associated with the database transaction is anomalous. For example, some embodiments may use a probabilistic method described above to determine that a database transaction has a 70% chance of being anomalous. If the anomaly threshold is equal to 60%, some embodiments may determine that the probability parameter satisfies the anomaly threshold because the probability exceeds the anomaly threshold. Alternatively, or in addition, some embodiments may use probability parameters other than probability value to determine whether or not an anomaly threshold is satisfied. For example, the process 300 may include determining whether a first or second probability parameter satisfies an anomaly threshold, where the first or second probability parameter may include a standard deviation, variance, or other measure of variability.

In some embodiments, the anomaly threshold may represent a maximum difference value between probabilities computed using different methods. Some embodiments may determine that a difference between different computed probabilities satisfies an anomaly threshold. For example, some embodiments may use a probabilistic method to determine that a database transaction has a 90% chance of being anomalous and may use a machine learning prediction model to determine that the same database transaction has a 20% chance of being anomalous. Some embodiments may determine a difference between the first and second probabilities and determine whether the difference satisfies an anomaly threshold. For example, if the anomaly threshold is 20%, some embodiments may determine that the probability difference of 70% satisfies the anomaly threshold.

Some embodiments may determine that a difference between a first set of probability parameters determined using a probabilistic model and a second set of probability parameters determined a machine learning model is greater than a probability threshold. Some embodiments may then determine whether the difference satisfies a threshold, where a determination that the threshold is satisfied may cause updates to a set of model parameters of the machine learning model. For example, some embodiments may use a probabilistic model to determine that a probability of a first anomaly occurring is 30% and that the probability of a second anomaly occurring is 55% based on a set of attributes obtained from a record and an associated communication session. Some embodiments may use a transformer neural network to determine that the probability of the first anomaly occurring is 35% and that the probability of the second anomaly occurring is 95%. Some embodiments may then determine whether the absolute value of the difference between 30% and 35% corresponding with the first anomaly flag is less than a first threshold and whether the absolute value of the difference between 55% and 95% corresponding with the second anomaly flag is less than a second threshold. Based on a determination that at least one threshold of the first threshold or the second threshold is satisfied, some embodiments may re-train the transformer neural network to update one or more model parameters of the transformer neural network. As described elsewhere in this disclosure, deep learning training operations may be computationally costly and time-consuming. By comparing machine learning results to the outputs of probabilistic models, some embodiments may reduce the number of training operations used to calibrate a machine learning model.

As described elsewhere in this disclosure, some embodiments may determine an attribute that includes a number using an NLP model. Furthermore, as described elsewhere in this disclosure, some embodiments may determine a probability that a database transaction or a record is anomalous. Some embodiments may then determine an expectation value based on the probability and the number and compare the expectation value to an anomaly threshold. For example, after obtaining the attribute "500" and determining that the probability of an anomaly 10%, some embodiments may determine an expectation value of "5" by multiplying "500" by "10%." Some embodiments may then determine that "5" satisfies an anomaly threshold if "5" exceeds the anomaly threshold.

As described elsewhere in this disclosure, some embodiments may determine a probability value or other probability parameter using a probabilistic model without determining a probability value using a machine learning model. Some embodiments may determine whether the first probability value satisfies the anomaly threshold and proceed to operations described for block 344 or 350 in response to a determination that the first probability or other probability parameter satisfies the anomaly threshold. In response to a determination that the anomaly threshold is satisfied, operations of the process 300 may proceed to operations described for block 344. Otherwise, operations of the process 30 may proceed to operations described for block 350.

In some embodiments, the process 300 may include updating a record associated with the communication session with an anomaly flag, as indicated by block 344. Some embodiments may update a record of the communication session in real-time, where a determination that the communication session is anomalous may cause an update of the record while the communication session is ongoing. For example, after a determination that a database transaction is anomalous, some embodiments may update a record storing attributes, metrics, or other data associated with the database transaction to indicate that the database transaction is anomalous during a time interval of a communication session associated with the record. Updating a record with an anomaly flag may include changing a value of a field of the record or adding a category. For example, some embodiments may update a record with an anomaly flag by adding the label "fraud" to a list of labels of the record.

Some embodiments may perform additional operations in response to a determination that a communication session is anomalous. For example, some embodiments may determine that a communication session is indicative of a fraud attempt. In response, some embodiments may terminate the communication session. After terminating the communication session, some embodiments may generate a notification on a graphical display of a computing device associated with a system administrator or other agent controlling one or more operations of a server used to perform one or more operations described in this disclosure. Alternatively, some embodiments may determine that a database transaction of an identified record had already occurred. In response to a determination that the record has been associated with an anomaly, some embodiments may send a database message to a database that causes the database to reverse the database transaction by reverting the values of the record to a previous set of values. For example, after determining that a database transaction is associated with an anomaly labeled "fraudulent," some embodiments may send a database message such as "rollback" to a database of transactions, a database of user accounts, or another database to reverse the database transactions to reverse a database transaction.

Some embodiments may track the probability parameters for one or more anomalies across multiple time intervals. For example, some embodiments may track a probability indicating fraud across a pair of time intervals, where the probability has increased between the pair of time intervals. Some embodiments may then generate a notification for display on a user interface indicating the increase.

Some embodiments may search through a set of records identifying previous communication sessions to determine one or more possible data patterns shared between repeated anomalies. For example, some embodiments may determine a set of related communication sessions to a first data session associated with a database transaction labeled as an anomaly by determining a data pattern based on the set of attributes. The data pattern may include one or more attributes in the attribute space of communication session. For example, a data pattern may include the array ["I am very trustworthy", "ask anyone", "not a fraud", [253, 5329]] to indicate a set of phrases and a vector representing a speech pattern, where the phrases or embedding vector representations thereof may be part of an attribute space. As used in this disclosure, an attribute space may include words, numbers, names, categories. Boolean values, vector representations, or other values that can be collected as attributes. Some embodiments may then search a set of records based on the first data pattern to select a set of data patterns close to the first data pattern in the attribute space based on an attribute space range threshold. In some embodiments, the attribute space range threshold may be a default value and may be normalized or otherwise scaled to a scale of the attribute space. Some embodiments may then retrieve a set of records of communication sessions based on the set of data patterns, where each record is associated with a data pattern of the set of data patterns. Some embodiments may then indicate the communication sessions identified by this set of selected records as a set of related sessions. Some embodiments may then display identifiers of the set of related sessions to indicate that the identified communication sessions are related. Alternatively, or in addition, some embodiments may also generate a new anomaly category specifying shared attributes of the data patterns of the set of related sessions. By relating different communication sessions based on a data pattern of attributes, some embodiments may identify one or more fraudulent users and prevent further anomalies from occurring.

In some embodiments, the process 300 may include determining whether there is an additional interval of the sequence of intervals, as indicated by block 350. In response to a determination that there is an additional interval of the sequence of intervals to process, operations of the process 300 may return to operations described for block 308 or 312. Otherwise, operations of the process 300 may stop.

Figure 4:
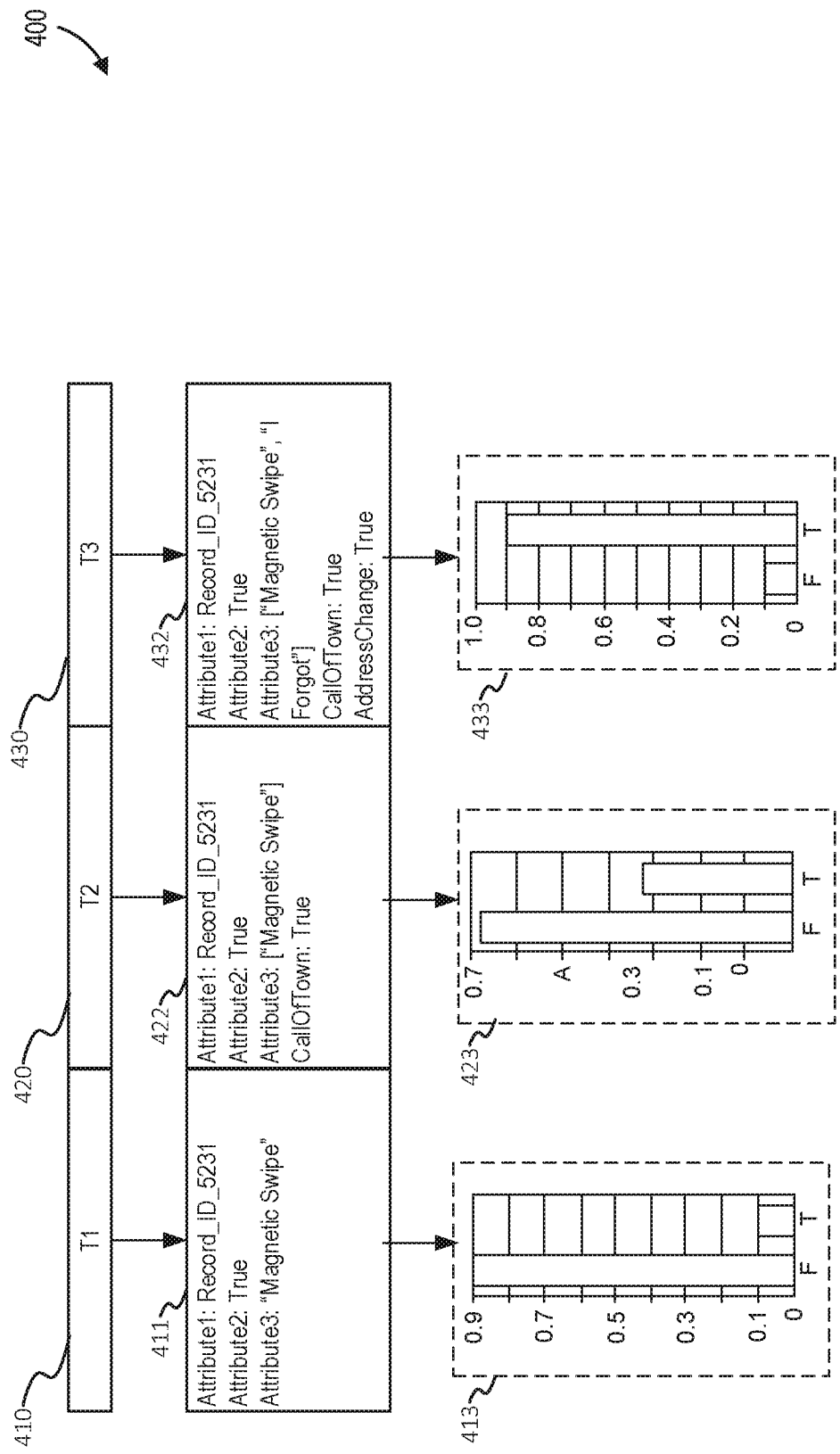
FIG. 4 shows a conceptual diagram illustrating the use of a probabilistic model to detect anomalies, in accordance with one or more embodiments.

FIG. 4 shows a conceptual diagram illustrating the use of a probabilistic model to detect anomalies, in accordance with one or more embodiments. The conceptual diagram 400 includes divisions of an audio stream into a first time interval 410, second time interval 420, and third time interval 430, where each of the time intervals 410, 420, and 430 are intervals of an audio stream. Some embodiments may use one or more operations described above to determine first filtered attributes 411, second filtered attributes 422, and third filtered attributes 432. For example, some embodiments may determine the first filtered attributes 411 by using an NLP model to determine an initial set of attributes based on audio data obtained from the first time interval 410. Some embodiments may then use the data filter on the initial set of attributes to obtain the first filtered attributes 411. Similarly, some embodiments may use the NLP model and data filter to determine the second filtered attributes 422 and third filtered attributes 432 based on the second time interval 420 and third time interval 430, respectively. In some embodiments, the data filter may be updated between the first time interval 410 and the second time interval 420. Alternatively, or in addition, the data filter may be updated between the second time interval 420 and the third time interval 430.

Some embodiments may then use a probabilistic model to determine a set of probability parameters based on attributes of the audio stream or a record associated with the audio stream. As shown by the plot 413, some embodiments may determine that the first filtered attributes 411 indicates that a probability parameter associated with the first time interval 410 is 0.10. Similarly, as shown by the plots 423 and 433, some embodiments may determine that the second filtered attributes 421 indicates that probability parameters associated with the second time interval 420 and the third time interval 430 are 0.32 and 0.9, respectively. Some embodiments may then compare each probability parameter with an anomaly threshold and send a notification to an administrator or perform another operation in response to a determination that a probability parameter satisfies the anomaly threshold. For example, if an anomaly threshold is equal to 0.5, some embodiments may determine that the probability parameter associated with the third time interval 430 satisfies the anomaly threshold. In response, some embodiments may update a record associated with the communication session with an anomaly flag.

In some embodiments, the various computers and subsystems illustrated in FIG. 1 may include one or more computing devices that are programmed to perform the functions described herein. The computing devices may include one or more electronic storages (e.g., e.g., database (s) 132, which may include historic transaction database(s) 134, model parameter database(s) 136, account database(s) 138, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable. WiFi, Bluetooth, near field communication, or other technologies). The network(s) 150 may include a network operating over the Internet, a mobile phone network, a mobile voice or data network (e.g., a 4G or LTE network), a cable network, a public switched telephone network, or other types of communications network or combinations of communications networks. The computing devices may include a plurality of hardware, software, and/or firmware components operating together. For example, the computing devices may be implemented by a cloud of computing platforms operating together as the computing devices.

The electronic storages may include non-transitory, computer-readable storage media that electronically stores information. The storage media of the electronic storages may include one or both of (i) system storage that is provided integrally (e.g., substantially non-removable) with servers or user devices; or (ii) removable storage that is removably connectable to the servers or user devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the set of processors, information obtained from servers, information obtained from user devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems or other components described herein is for illustrative purposes, and is not intended to be limiting, as any of subsystems other components may provide more or less functionality than is described. For example, one or more of subsystems may be eliminated, and some or all of its functionality may be provided by other ones of the subsystems.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the context clearly indicates otherwise. Thus, for example, reference to "an element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., one or more processors performing steps/operations A, B. C. and D) encompasses both all such attributes or functions being mapped to all such objects and subsets of the attributes or functions being mapped to subsets of the attributes or functions (e.g., both all processors each performing steps/operations A-D. and a case in which processor 1 performs step/operation A, processor 2 performs step/operation B and part of step/operation C. and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g.. "performing X on items, performing Y on the X'ed items") used for purposes of making claims more readable rather than specifying sequence. Statements referring to "at least Z of A, B, and C," and the like (e.g., "at least Z of A, B. or C"), refer to at least Z of the listed categories (A, B, and C) and do not require at least Z units in each category. Unless the context clearly indicates otherwise, it is appreciated that throughout this specification discussions utilizing terms such as "processing." "computing," "calculating," "determining" etc. refer to actions or processes of a specific apparatus, such as a special purpose computer or a similar special purpose electronic processing/computing device. As used in this application, updating data may include modifying data already stored in a storage or creating the data and storing the newly created data in storage. Furthermore, as used in this disclosure, updating a set of items may include generating the set of items, modifying one or more items of an existing set of items, adding one or more items to an existing set of items, deleting one or more items from the set of items, or deleting the entire set of items.

The present techniques will be better understood with reference to the following enumerated embodiments:

1. A method comprising: detecting an audio stream with a user during a communication session; updating, at each interval of a sequence of intervals of the communication session, a set of attributes related to the user by: performing natural language processing on the audio stream to supplement the set of user-related attributes with attributes derived from the audio stream during the interval; updating, during the interval, a set of filtered attributes by selecting attributes of the updated set of user-related attributes based on a set of filter criteria associated with a data filter; using the updated set of filtered attributes to query a set of databases to obtain anomaly-related datasets related to the set of user-related attributes, wherein each dataset of the anomaly-related datasets is associated with least one filtered attribute of the updated set of filtered attributes; executing, during the communication session, a probabilistic program by: using a machine learning model to determine a first probability of an anomaly occurring based on the set of user-related attributes; determining a second probability of the anomaly occurring by 1) determining a set of probability parameters for a projected probability of anomaly occurrence based on the datasets and 2) determining the second probability based on the probability parameters and the set of filtered attributes; and in response to a determination that a difference between the first and second probabilities satisfies an anomaly threshold indicating the detection of the anomaly, updating, during the communication session, a record identifying the communication session with an anomaly flag.

2. A method comprising: detecting an audio stream during a communication session with a user; performing, during the communication session, natural language processing on the audio stream to update a set of attributes based on attributes derived from the audio stream; updating, at each interval of a set of intervals of the communication session, a set of filter values during the interval based on the set of attributes after the set of attributes is updated; using the set of filter values after the set of attributes is updated to query a set of databases to obtain datasets associated with the set of filter values; executing, during the communication session, a probabilistic program by: determining a set of probability parameters for a projected probability of anomaly occurrence based on the datasets; and determining a set of probabilities for anomaly occurrence based on the set of probability parameters and the set of attributes; and in response to a determination that the set of probabilities satisfies a threshold, updating a record identifying the communication session with an anomaly.

3. A method comprising: detecting an audio stream during a communication session with a user, performing natural language processing on the audio stream to update a set of attributes by supplementing the set of attributes based on attributes derived from the audio stream; updating a set of filter values based on the updated set of attributes; using the updated set of filter values to query a set of databases to obtain datasets; executing, during the communication session, a probabilistic program by determining a set of probability parameters characterizing a probability of an anomaly occurring based on the datasets and the set of attributes; determining whether the probability satisfies a threshold; and in response to a determination that the probability satisfies the threshold, updating a record identifying the communication session to indicate that the threshold is satisfied.

4. The method of any of embodiments 1 to 3, wherein the set of user-related attributes is a first set of user-related attributes, the instructions further comprising: retrieving a user record associated with the user; obtaining a previous set of user-related attributes of the user record, wherein each respective attribute of the previous set of user-related attributes is a same data type as a respective attribute of the first set of user-related attributes; at each interval of the sequence of intervals, determining a comparison value between an attribute value of the previous set of user-related attributes and an attribute value of the set of user-related attributes, wherein: updating the set of user-related attributes comprises supplementing the set of user-related attributes with the comparison value; updating the data filter comprises updating the data filter based on the comparison value; and executing the probabilistic program comprises determining the second probability based on the comparison value.

5. The method of any of embodiments 1 to 4, wherein performing the natural language processing on the audio stream to supplement the set of user-related attributes comprises: obtaining a set of intent categories associated with different transaction types of database transactions to a set of records associated with the user; obtaining a set of embedding vectors based on n-grams detected from the audio stream; and determining an intent category based on the set of embedding vectors, wherein the intent category is associated with a first transaction type, wherein an indicator of the intent category is an attribute of the set of user-related attributes, and wherein updating the set of filtered attributes comprises: determining whether the first transaction type matches with any transaction types of a recorded set of database transactions associated with the set of records associated with the user; and in response to a determination that the first transaction type does not match with transaction types of the recorded set of database transactions, updating the set of filtered attributes to include the intent category.

6. The method of any of embodiments 1 to 5, wherein updating the attributes comprises: obtaining a first attribute value for an attribute derived from the audio stream during a first interval of the sequence of intervals; obtaining a second attribute value for the attribute derived during a second interval of the sequence of intervals; determining a difference value between the first and second attribute values, wherein: the updated set of filtered attributes comprises the difference value; and using the updated set of filtered attributes to query the set of databases comprises using the difference value to query the set of databases.

7. The method of any of embodiments 1 to 6, wherein: using the machine learning model comprises selecting the machine learning model from a set of models based on the set of filtered attributes; the set of models comprises a neural network model; and the set of models comprises a regression model.

8. The method of any of embodiments 1 to 7, further comprising: obtaining a delay duration threshold; within a first interval, determining a time difference between when an updated set of user-related attributes is provided and when at least one of the set of probabilities is determined; determining whether the time difference is greater than the delay duration threshold; in response to a determination that the time difference is greater than the delay duration threshold, reducing a number of queries made to the set of databases to obtain the datasets.

9. The method of any of embodiments 1 to 8, further comprising terminating the communication session in response to a determination that the threshold is satisfied.

10. The method of any of embodiments 1 to 9, wherein the user is a first user, wherein supplementing the set of attributes comprises: determining a graphical display of a second user in communication with the first user, determining whether the set of attributes comprises a first attribute that satisfies a set of prompting criteria; in response to a determination that the first attribute satisfies the set of prompting criteria: retrieving a record value of a record identifying the first user; and displaying a notification comprising the record value on the graphical display.

11. The method of any of embodiments 1 to 10, wherein updating the set of filter values comprises: determining whether a set of filter criteria records indicating the set of filter values was updated; in response to a determination that the set of filter criteria records was updated, obtain the updated set of filter criteria records, wherein the updated set of filter criteria records comprises a first embedding vector; determining whether the set of attributes comprises the first embedding vector, and in response to a determination that the set of attributes comprises the first embedding vector, updating the set of filter values to indicate the detection of the first embedding vector.

12. The method of any of embodiments 1 to 11, further comprising: in response to a determination that the set of probabilities satisfies the threshold, determining whether a first attribute of the set of attributes is indicated by the set of filter values; and in response to a determination that the first attribute is not indicated by the set of filter values, updating a record indicating the first attribute.

13. The method of any of embodiments 1 to 12, wherein the threshold is a first threshold, and wherein the set of probabilities is a first set of probabilities, the method further comprising: executing a machine learning model based on the set of attributes to determine a second set of probabilities; determining a difference value between a probability of the first set of probabilities and a probability of the second set of probabilities; and determining whether the difference value exceeds a second threshold; and in response to a determination that the difference value exceeds the second threshold, cause a training operation to update a set of model parameters of the machine learning model.

14. The method of any of embodiments 1 to 13, wherein: the set of probability parameters is a first set of probability parameters; the first set of probability parameters comprises a measure of central tendency or a measure of variability; the first set of probability parameters characterizes a first probability distribution determining the first set of probability parameters comprises determining the first set of probability parameters based on a first dataset associated with a first filter value of the set of filter values; the method further comprises determining a second set of probability parameters characterizing a second probability distribution based on a second dataset associated with a second filter value of the set of filter values; and executing the probabilistic program comprises determining the set of probabilities based on the first and second sets of probability parameters.

15. The method of any of embodiments 1 to 14, further comprising: causing, during a first interval of the set of intervals, a user interface to show a first visualization comprising a shape or line indicating a probability of the set of probabilities for anomaly occurrence; determining whether a new attribute has been added to the set of attributes based on a comparison between the set of attributes corresponding with the set of filter values during a first interval and the set of filter values corresponding with the set of filter values during a second interval; determining a probability difference between the set of probabilities determined during the first interval and the set of probabilities determined during the second interval; and updating the user interface to indicate a change in the probability based on the probability difference by updating the first visualization, wherein an interaction with a user interface element corresponding with the probability difference causes the user interface to display a filter value corresponding with the new attribute or an attribute subset of the set of attributes used to determine the filter value corresponding with the new attribute.

16. The method of any of embodiments 1 to 15, further comprising, in response to a determination that at the set of probabilities satisfies the threshold, searching a set of records identifying previous communication sessions to retrieve a set of related sessions by: generating a first data pattern based on the set of attributes, wherein the first data pattern comprises values of the set of attributes in an attribute space: searching the set of records based on the first data pattern to select a set of data patterns within an attribute space range threshold of the first data pattern in the attribute space; and selecting the set of related sessions based on the set of data patterns and the set of records identifying previous communication sessions, wherein each record of the subset of records is associated with a data pattern of the set of data patterns.

17. The method of any of embodiments 1 to 16, further comprising: identifying a database transaction of a database associated with the user based on the record; and sending a database message to a transactions database to reverse the database transaction.

18. The method of any of embodiments 1 to 17, wherein updating the set of filter values comprises updating the set of filter values based on a set of prioritization embedding vectors, the operations further comprising: determining whether the set of attributes indicates that a set of embedding vectors generated by the natural language processing of the audio stream matches the set of prioritization embedding vectors; and in response to a determination that the set of attributes indicates that the set of embedding vectors matches the set of prioritization embedding vectors, sending a notification message to a third server, and sending instructions to a server to prevent changes to a value of the record.

19. The method of any of embodiments 1 to 18, wherein: the threshold is a first threshold; updating the set of filter values comprises updating the set of filter values to comprise a first set of filter values during a first interval and updating the set of filter values to comprise a second set of filter values during a second interval; determining a first probability during the first interval; determining a second probability during the second interval that occurs after the first interval; and determining a difference value between the first and second probabilities; and based on a determination that the difference value satisfies a second threshold, generate a notification message for display on a user interface indicating the probability of the anomaly occurring has increased.

20. The method of any of embodiments 1 to 19, wherein the threshold is a first threshold, and wherein performing natural language processing on the audio stream comprises identifying a quantity that was stated in the audio stream, the operations further comprising determining an expectation value based on the quantity and the probability, wherein determining whether the probability satisfies the threshold comprises determining whether the expectation value satisfies the threshold.

What is claimed is:

1. A system for real-time anomaly detection based on attributes derived from audio streams comprising one or more memory devices storing instructions and one or more processors configured to execute the instructions that, when executed, cause operations comprising:
    detecting an audio stream with a user during a communication session;
    updating, at each interval of a sequence of intervals of the communication session, a set of attributes related to the user by:
        performing natural language processing on the audio stream to supplement the set of user-related attributes with attributes derived from the audio stream during the interval;
        updating, during the interval, a set of filtered attributes by selecting attributes of the updated set of user-related attributes based on a set of filter criteria associated with a data filter;
        using the updated set of filtered attributes to query a set of databases to obtain anomaly-related datasets related to the set of user-related attributes, wherein each dataset of the anomaly-related datasets is associated with least one filtered attribute of the updated set of filtered attributes;

executing, during the communication session, a probabilistic program by:
using a machine learning model to determine a first probability of an anomaly occurring based on the set of user-related attributes;
determining a second probability of the anomaly occurring by 1) determining a set of probability parameters for a projected probability of anomaly occurrence based on the datasets and 2) determining the second probability based on the probability parameters and the set of filtered attributes; and
in response to a determination that a difference between the first and second probabilities satisfies an anomaly threshold indicating the detection of the anomaly, updating, during the communication session, a record identifying the communication session with an anomaly flag.

2. The system of claim 1, wherein the set of user-related attributes is a first set of user-related attributes, the instructions further comprising:
retrieving a user record associated with the user,
obtaining a previous set of user-related attributes of the user record, wherein each respective attribute of the previous set of user-related attributes is a same data type as a respective attribute of the first set of user-related attributes;
at each interval of the sequence of intervals, determining a comparison value between an attribute value of the previous set of user-related attributes and an attribute value of the set of user-related attributes, wherein:
updating the set of user-related attributes comprises supplementing the set of user-related attributes with the comparison value;
updating the data filter comprises updating the data filter based on the comparison value; and
executing the probabilistic program comprises determining the second probability based on the comparison value.

3. The system of claim 1, wherein performing the natural language processing on the audio stream to supplement the set of user-related attributes comprises:
obtaining a set of intent categories associated with different transaction types of database transactions to a set of records associated with the user;
obtaining a set of embedding vectors based on n-grams detected from the audio stream; and
determining an intent category based on the set of embedding vectors, wherein the intent category is associated with a first transaction type, wherein an indicator of the intent category is an attribute of the set of user-related attributes, and wherein updating the set of filtered attributes comprises:
determining whether the first transaction type matches with any transaction types of a recorded set of database transactions associated with the set of records associated with the user; and
in response to a determination that the first transaction type does not match with transaction types of the recorded set of database transactions, updating the set of filtered attributes to include the intent category.

4. The system of claim 1, wherein updating the attributes comprises:
obtaining a first attribute value for an attribute derived from the audio stream during a first interval of the sequence of intervals;
obtaining a second attribute value for the attribute derived during a second interval of the sequence of intervals;

determining a difference value between the first and second attribute values, wherein:
the updated set of filtered attributes comprises the difference value; and
using the updated set of filtered attributes to query the set of databases comprises using the difference value to query the set of databases.

5. The system of claim 1, wherein:
using the machine learning model comprises selecting the machine learning model from a set of models based on the set of filtered attributes;
the set of models comprises a neural network model; and
the set of models comprises a regression model.

6. A method comprising:
detecting an audio stream during a communication session with a user;
performing, during the communication session, natural language processing on the audio stream to update a set of attributes based on attributes derived from the audio stream;
updating, at each interval of a set of intervals of the communication session, a set of filter values during the interval based on the set of attributes after the set of attributes is updated;
using the set of filter values after the set of attributes is updated to query a set of databases to obtain datasets associated with the set of filter values;
executing, during the communication session, a probabilistic program by:
determining a set of probability parameters for a projected probability of anomaly occurrence based on the datasets; and
determining a set of probabilities for anomaly occurrence based on the set of probability parameters and the set of attributes; and
in response to a determination that the set of probabilities satisfies a threshold, updating a record identifying the communication session with an anomaly.

7. The method of claim 6, further comprising:
obtaining a delay duration threshold;
within a first interval, determining a time difference between when an updated set of user-related attributes is provided and when at least one of the set of probabilities is determined;
determining whether the time difference is greater than the delay duration threshold;
in response to a determination that the time difference is greater than the delay duration threshold, reducing a number of queries made to the set of databases to obtain the datasets.

8. The method of claim 6, further comprising terminating the communication session in response to a determination that the threshold is satisfied.

9. The method of claim 6, wherein the user is a first user, wherein supplementing the set of attributes comprises:
determining a graphical display of a second user in communication with the first user,
determining whether the set of attributes comprises a first attribute that satisfies a set of prompting criteria;
in response to a determination that the first attribute satisfies the set of prompting criteria:
retrieving a record value of a record identifying the first user; and
displaying a notification comprising the record value on the graphical display.

10. The method of claim 6, wherein updating the set of filter values comprises:

determining whether a set of filter criteria records indicating the set of filter values was updated;
in response to a determination that the set of filter criteria records was updated, obtain the updated set of filter criteria records, wherein the updated set of filter criteria records comprises a first embedding vector;
determining whether the set of attributes comprises the first embedding vector, and
in response to a determination that the set of attributes comprises the first embedding vector, updating the set of filter values to indicate the detection of the first embedding vector.

11. The method of claim 6, further comprising:
in response to a determination that the set of probabilities satisfies the threshold, determining whether a first attribute of the set of attributes is indicated by the set of filter values; and
in response to a determination that the first attribute is not indicated by the set of filter values, updating a record indicating the first attribute.

12. The method of claim 6, wherein the threshold is a first threshold, and wherein the set of probabilities is a first set of probabilities, the method further comprising:
executing a machine learning model based on the set of attributes to determine a second set of probabilities;
determining a difference value between a probability of the first set of probabilities and a probability of the second set of probabilities; and
determining whether the difference value exceeds a second threshold; and
in response to a determination that the difference value exceeds the second threshold, cause a training operation to update a set of model parameters of the machine learning model.

13. The method of claim 6, wherein:
the set of probability parameters is a first set of probability parameters;
the first set of probability parameters comprises a measure of central tendency or a measure of variability;
the first set of probability parameters characterizes a first probability distribution determining the first set of probability parameters comprises determining the first set of probability parameters based on a first dataset associated with a first filter value of the set of filter values;
the method further comprises determining a second set of probability parameters characterizing a second probability distribution based on a second dataset associated with a second filter value of the set of filter values; and
executing the probabilistic program comprises determining the set of probabilities based on the first and second sets of probability parameters.

14. The method of claim 6, further comprising:
causing, during a first interval of the set of intervals, a user interface to show a first visualization comprising a shape or line indicating a probability of the set of probabilities for anomaly occurrence;
determining whether a new attribute has been added to the set of attributes based on a comparison between the set of attributes corresponding with the set of filter values during a first interval and the set of filter values corresponding with the set of filter values during a second interval;
determining a probability difference between the set of probabilities determined during the first interval and the set of probabilities determined during the second interval; and
updating the user interface to indicate a change in the probability based on the probability difference by updating the first visualization, wherein an interaction with a user interface element corresponding with the probability difference causes the user interface to display a filter value corresponding with the new attribute or an attribute subset of the set of attributes used to determine the filter value corresponding with the new attribute.

15. The method of claim 6, further comprising, in response to a determination that at the set of probabilities satisfies the threshold, searching a set of records identifying previous communication sessions to retrieve a set of related sessions by:
generating a first data pattern based on the set of attributes, wherein the first data pattern comprises values of the set of attributes in an attribute space;
searching the set of records based on the first data pattern to select a set of data patterns within an attribute space range threshold of the first data pattern in the attribute space; and
selecting the set of related sessions based on the set of data patterns and the set of records identifying previous communication sessions, wherein each record of the subset of records is associated with a data pattern of the set of data patterns.

16. The method of claim 6, further comprising:
identifying a database transaction of a database associated with the user based on the record; and
sending a database message to a transactions database to reverse the database transaction.

17. A non-transitory, machine-readable medium storing instructions that, when executed by one or more processors, performs operations comprising:
detecting an audio stream during a communication session with a user;
performing natural language processing on the audio stream to update a set of attributes by supplementing the set of attributes based on attributes derived from the audio stream;
updating a set of filter values based on the updated set of attributes;
using the updated set of filter values to query a set of databases to obtain datasets;
executing, during the communication session, a probabilistic program by determining a set of probability parameters characterizing a probability of an anomaly occurring based on the datasets and the set of attributes;
determining whether the probability satisfies a threshold; and
in response to a determination that the probability satisfies the threshold, updating a record identifying the communication session to indicate that the threshold is satisfied.

18. The medium of claim 17, wherein updating the set of filter values comprises updating the set of filter values based on a set of prioritization embedding vectors, the operations further comprising:
determining whether the set of attributes indicates that a set of embedding vectors generated by the natural language processing of the audio stream matches the set of prioritization embedding vectors; and
in response to a determination that the set of attributes indicates that the set of embedding vectors matches the set of prioritization embedding vectors, sending a notification message to a third server, and sending instructions to a server to prevent changes to a value of the record.

19. The medium of claim 17, wherein:

the threshold is a first threshold;

updating the set of filter values comprises updating the set of filter values to comprise a first set of filter values during a first interval and updating the set of filter values to comprise a second set of filter values during a second interval;

determining a first probability during the first interval;

determining a second probability during the second interval that occurs after the first interval; and determining a difference value between the first and second probabilities; and based on a determination that the difference value satisfies a second threshold, generate a notification message for display on a user interface indicating the probability of the anomaly occurring has increased.

20. The medium of claim 17, wherein the threshold is a first threshold, and wherein performing natural language processing on the audio stream comprises identifying a quantity that was stated in the audio stream, the operations further comprising determining an expectation value based on the quantity and the probability, wherein determining whether the probability satisfies the threshold comprises determining whether the expectation value satisfies the threshold.

* * * * *